(12) United States Patent
Huang (10) Patent No.: US 10,770,725 B2
(45) Date of Patent: Sep. 8, 2020

(54) ALKALINE BATTERY CATHODE STRUCTURES INCORPORATING MULTIPLE CARBON MATERIALS AND ORIENTATIONS

(71) Applicant: Energizer Brands, LLC, St. Louis, MO (US)

(72) Inventor: Weiwei Huang, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 23 days.

(21) Appl. No.: 16/203,297

(22) Filed: Nov. 28, 2018

(65) Prior Publication Data

US 2019/0097225 A1 Mar. 28, 2019

Related U.S. Application Data

(62) Division of application No. 15/232,850, filed on Aug. 10, 2016, now Pat. No. 10,177,375.

(51) Int. Cl.
| | |
|---|---|
| *H01M 4/50* | (2010.01) |
| *H01M 4/06* | (2006.01) |
| *H01M 4/38* | (2006.01) |
| *H01M 4/62* | (2006.01) |
| *H01M 4/04* | (2006.01) |
| *H01M 4/26* | (2006.01) |
| *H01M 10/24* | (2006.01) |
| *H01M 4/02* | (2006.01) |

(52) U.S. Cl.
CPC ......... *H01M 4/502* (2013.01); *H01M 4/0402* (2013.01); *H01M 4/0411* (2013.01); *H01M 4/0433* (2013.01); *H01M 4/0485* (2013.01); *H01M 4/06* (2013.01); *H01M 4/26* (2013.01); *H01M 4/381* (2013.01); *H01M 4/382* (2013.01); *H01M 4/624* (2013.01); *H01M 4/625* (2013.01); *H01M 10/24* (2013.01); *H01M 2004/028* (2013.01)

(58) Field of Classification Search
CPC .. H01M 4/502; H01M 4/0433; H01M 4/0485; H01M 4/0411; H01M 4/0402
See application file for complete search history.

(56) References Cited

U.S. PATENT DOCUMENTS

| | | | | |
|---|---|---|---|---|
| 2006/0046135 A1* | 3/2006 | Huang | ..................... | H01M 4/06 429/128 |
| 2008/0090149 A1* | 4/2008 | Sano | ..................... | H01M 4/624 429/220 |
| 2011/0155945 A1* | 6/2011 | Soong | ..................... | C08K 3/08 252/62.54 |
| 2014/0205911 A1* | 7/2014 | Zaghib | ................... | H01G 11/32 429/304 |

* cited by examiner

*Primary Examiner* — Matthew J Merkling
(74) *Attorney, Agent, or Firm* — Alston & Bird LLP (57) ABSTRACT

Cathode active materials for alkaline cells are disclosed. In particular, the cathode structures encompass conductive carbons introduced to the cathode so as to have a specific spatial orientation and/or a multi-carbon structure. The overall intent is to leverage the conductor(s) provided to the cathode structure to improve electronic and ionic conductance and, by extension, improve battery discharge performance.

19 Claims, 4 Drawing Sheets

ALKALINE BATTERY CATHODE STRUCTURES INCORPORATING MULTIPLE CARBON MATERIALS AND ORIENTATIONS

CROSS-REFERENCE TO RELATED APPLICATIONS

This patent application is a divisional of U.S. patent application Ser. No. 15/232,850, filed Aug. 10, 2016, which is incorporated herein by reference in its entirety.

FIELD OF INVENTION

The present invention relates to cathode active materials for alkaline cells. In particular, the present invention relates to cathode structures incorporating conductive carbons possessing a specific spatial orientation and/or multi-carbon structure intended to improve electronic and ionic conductance within the cathode itself.

BACKGROUND

The use of carbon materials as conductive aids in battery electrodes is well-known. Virtually all battery systems using particulate materials can be mixed with carbon-based particulates and/or coatings to improve the conductivity and, by extension, discharge performance of the electrode in which they are mixed. Despite the fact that many battery systems rely on carbon conductors, the nature and use of these conductors varies considerably depending upon the intended use and discharge regime (e.g., anode vs. cathode; primary vs. secondary) and battery chemistry (e.g., lithium-ion, lithium-iron disulfide, zinc-air, zinc-manganese dioxide, etc.).

For example, secondary batteries often rely on carbon electrode structures to facilitate the ionic transport within the carbon material during charge and discharge cycling. Consequently, the combination of specific sources of carbons, as well as their orientation and structure, are dictated by the exigencies of this intended use. U.S. Pat. No. 8,765,302 describes a graphene-enabled vanadium oxide composite composition for use as a lithium cathode (i.e., positive electrode) active material exhibiting unprecedented specific capacity, capacity retention and rate capability characteristics. U.S. Pat. No. 8,691,441 discloses mutually bonded or agglomerated graphene sheets and particles for use in lithium battery cathode active materials.

Carbon structures for anode (i.e., negative electrode) materials in secondary cells are known and specifically optimized for ionic intercalation. U.S. Pat. No. 8,440,352 claims a fine carbon powder agglomerated onto the surface of plate-shaped carbon powder particles, with an amorphous carbon coating overlaid onto the powder, with the resulting carbon structure being incorporated into the negative electrode plate of an intercalating, secondary lithium battery. United States Patent Publication 2015/0194668 describes a composite graphite particle for use as an active material in a nonaqueous secondary battery in which the particle comprises graphite and metallic particle capable of alloying with lithium.

Separately, carbons are conductive powders may be mixed with particulate active materials to facilitate conduction of electronics in the electrode structure during discharge. For example, in lithium-iron disulfide primary batteries, U.S. Pat. No. 8,785,044 discloses a cathode formulation relying on a combination of graphite and acetylene black to enable significantly larger amounts of active iron disulfide in the cathode coating. Of course, the electrochemical reaction inherent to this system results in the formation of conductive iron, so the ultimate considerations in the amount and dispersion of carbon in the initial cathode formulation is distinct from other battery systems which produce different reaction products.

As a separate example, U.S. Pat. No. 6,828,064 discloses the use of expanded graphite particles in electrochemical cells, particularly alkaline cells having cathodes formed from a mixture of manganese dioxide and conductive carbon materials forming a conductive matrix. Because manganese dioxide has a relatively low level of conductivity, conductive agents such as graphite, expanded graphite and/or acetylene black are commonly used as conductive agents, although their use entails volumetric and unwanted absorption concerns.

U.S. Pat. No. 8,298,706 provides a generic listing of the range of potential conductive additives in alkaline batteries. Anywhere between 2-35 wt. % of conductive additive can be selected from a list that includes graphite, carbon black, acetylene black, partially graphitized carbon black, carbon fibers and/or nanofibers, carbon nanotubes, and graphene, as well as various non-carbon based conductors (e.g., silver, gold, or nickel powders). The graphite is further characterized as non-synthetic/natural non-expanded graphite, synthetic non-expanded graphite, non-synthetic/natural expanded graphite, synthetic expanded graphite and oxidation-resistant, synthetic non-expanded graphite.

U.S. Pat. No. 8,920,969 also identifies a number of different carbon-based conductor materials that may be appropriate for use in alkaline batteries. However, it is suggested that relatively low weight percentages (less than 3.75 wt. %, with preferred ranges between 2.0 and 3.5 wt. %) of conductor enable the inclusion of higher levels of active material. In the same manner, it is suggested that the conductor consist only of expanded graphite, as unexpanded graphite is significantly less conductive and, by implication, less desirable for use in alkaline or other batteries.

United States Patent Publication Nos. 2012/005229 and 2008/0116423 generally describe agglomerated cathode active material structures for secondary (i.e., rechargeable) nonaqueous batteries. The use of agglomerates in alkaline battery anodes has also been noted in U.S. Pat. Nos. 7,709,144 and 7,332,247.

Figure 1:
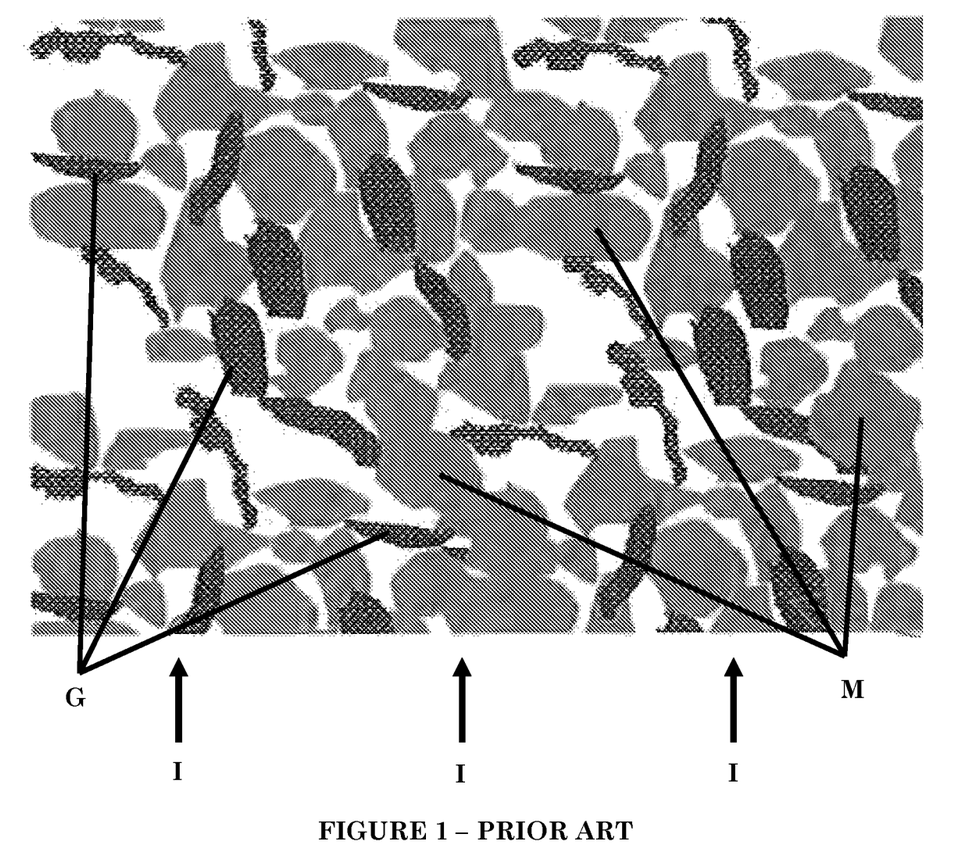
FIG. 1 is a diagrammatic illustration of how graphite flakes disperse within an exemplary cathode mixture for an alkaline battery.

Mixtures of active material (e.g., manganese dioxide) and conductive carbons usually result in randomized dispersion of the materials. When the conductive carbons have a particular shape (e.g., graphite), the orientation of those shapes will also occur randomly. FIG. 1 illustrates a non-optimized, random distribution of plate-shaped graphite particles dispersed within a manganese dioxide electrode mixture, with manganese dioxide particles or agglomerates M mixed with graphite particles G having essentially random orientations in comparison to the putative current flowing through the mixture (as generally represented by I).

The following description and the drawings disclose various illustrative aspects. Some improvements and novel aspects may be expressly identified, while others may be apparent from the description and drawings.

SUMMARY OF INVENTION

One embodiment of the invention comprises a positive electrode for an alkaline primary battery having any combination of the following features:

at least one active material;

a particulate conductive material dispersed within the active material;

wherein the particulate conductive material has a flat planar structure with at least 90% of the particulates aligned in substantially identical spatial orientations;

wherein the electrode possesses a circular cylindrical shape;

wherein the particulate conductive material comprises anisometric graphite;

wherein the active material comprises manganese dioxide; and wherein the active material consists of at least 90 wt. % of manganese dioxide.

Another embodiment of the invention comprises a method of making a positive electrode for an alkaline primary battery having any combination of the following features:

providing a particulate, conductive material having a basal plane to a cathode mixture including at least one active material;

dispersing the conductive material within the cathode mixture so that at least 90% of the particles of the active material have a substantially parallel orientation along their basal planes;

wherein the orientation of the conductive material is accomplished by at least one of: stretching, freeze casting, co-extrusion, and magnetic orientation.

A further embodiment of the invention comprises a positive electrode for an alkaline primary battery having any combination of the following features:

at least one particulate active material;

a first conductive material;

a second conductive material having a different physical size in comparison to the first conductive material;

wherein the first conductive material is entrained within particles of the active material to form active material agglomerates;

wherein the second conductive material adheres to at least a portion of a surface of the active material agglomerates;

wherein the first conductive material forms a conductive pathway within individual active material agglomerates and the second conductive material forms a conductive network between a plurality of active material agglomerates;

wherein the first conductive material comprises synthetic graphite;

wherein the second conductive material comprises at least one selected from the group consisting of: unexpanded graphite, expanded graphite, graphene, graphite tubes, and graphite rods;

wherein the first conductive material consists of synthetic graphite and the second conductive material consists of an anisometric graphite;

wherein the first conductive material is oriented in common direction within the electrode;

wherein particulate active material comprises manganese dioxide;

wherein at least 90 wt. % of the electrode consists of manganese dioxide; and wherein the electrode has a tubular cylindrical shape.

A still further embodiment of the invention comprises a method of making a positive electrode for an alkaline primary battery having any combination of the following features:

a first mixing step including dispersing a first conductive material in a particulate active material and forming agglomerates in which the first conductive material is entrained within the agglomerates;

a second mixing step, performed at a lower energy in comparison to the first mixing step, including adhering a second conductive material with at least a portion of a surface of the agglomerates;

wherein the second conductive material comprises particles of a larger size in comparison to particles of the first conductive material;

wherein the forming of agglomerates comprises compacting the dispersed first conductive material and particulate active material;

wherein the active material comprises manganese dioxide;

wherein the manganese dioxide consists of least 90 wt. % of the positive electrode;

wherein the first conductive material comprises synthetic graphite;

wherein the second conductive material comprises at least one selected from the group consisting of: unexpanded graphite, expanded graphite, graphene, graphite tubes, and graphite rods;

orienting the first conductive material to align the first conductive material in a common direction within the electrode;

wherein the orienting of the first conductive material includes at least one of: stretching, freeze casting, co-extrusion, and magnetic orientation;

forming the cathode structure produced by the second mixing step into a tubular cylinder; and wherein the forming the cathode structure is achieved by ring molding or impact molding.

BRIEF DESCRIPTION OF THE DRAWINGS

The accompanying drawings illustrate various systems, apparatuses, devices and related methods, in which like reference characters refer to like parts throughout, and in which.

The figures of any document incorporated by reference are similarly incorporated by reference herein.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Unless noted to the contrary, all methods and experiments contemplate ambient environmental conditions, including temperature and pressure. Further, common analytical instruments and/or laboratory techniques—including but not limited to standardized testing protocols such as those published by the American National Standards Institute and other, similar organizations—may be used to inform the methods, compositions and other material characteristics disclosed herein.

While it is generally known that orientation of conductive carbons in secondary cells may impart certain advantages (as noted above), artisans in the field of alkaline primary batteries had placed a greater on effectively and completely mixing active and inactive species in cathodes. The inventors realized additional advantages might be realized in this system if the conductive carbons could be oriented in a more ordered and optimized manner relative to the anticipated current flow through that mixture.

Figure 2A:
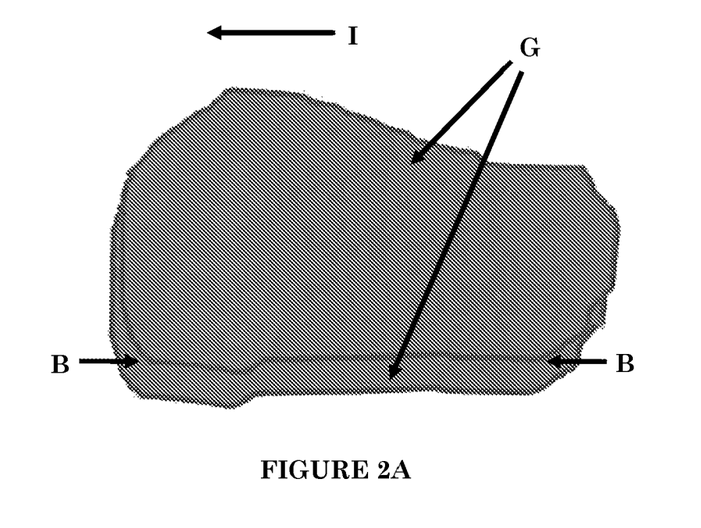
FIGS. 2A and 2B are diagrammatic illustrations of preferred orientations of the graphite relative to the anticipated current flow according to certain embodiments of the invention.
Figure 2B:
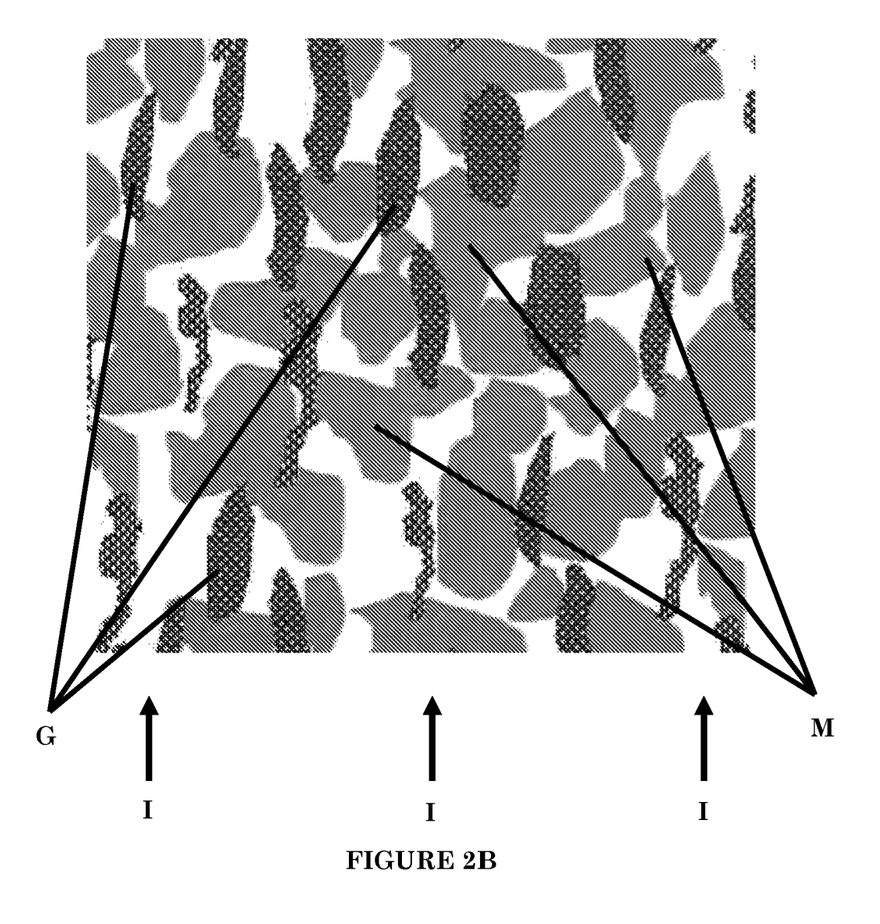

In particular, as shown in FIGS. 2A and 2B, if graphite G were oriented so that current flow I occurred through the basal plane form by line B-B within each graphite particle (i.e., so that current followed from edge to edge), electronic conductivity and ionic diffusivity would be improved, as the relative number of graphite particles required to form an electronic connection would be minimized. FIG. 2B diagrammatically illustrates the collective effect this preferred orientation might have, with G indicating graphite particles, M showing the particulate active material (e.g., manganese dioxide) and I representing the anticipated current flow.

In order to achieve such uniformity in the alignment of the graphite, a number of processes could be employed. For example, after mixing the active and inactive materials, the cathode could be mixed so as to have doughy or rubbery consistency, so that it might be stretched and generally worked in order to urge the graphite particles into a uniform orientation consistent with the stretching/working. Freeze casting, coextrusion of active material and properly aligned conductive material(s), and/or magnetic alignment (either through the use of magnetic nanoparticles or other magnetics additives adhered to the conductive material or through the use of a conductor that is susceptible to reorientation when exposed to a magnetic field) are other potential processes by which the desired alignment of the conductive material within the positive electrode may be achieved.

Uniformity in the alignment of the graphite (or other conductive material) is achieved when at least 60%, more preferably at least 90%, and most preferably at least 95% of the particles are substantially aligned. Substantial alignment is determined by projecting an imaginary axial line on each particle's elongated axis, with the specified percentage (e.g., 60%, 90%, or 95%) of such imaginary axial lines within a range of no more than 60 degrees, more preferably no more than 45 degrees, and most preferably no more than 30 degrees of one another.

Of course, the bobbin-style construction normally employed by cylindrical alkaline batteries (described in more detail below) presents unique challenges insofar as the current flow is most likely to be in a radial plane, owing to the circular tube structure of standard alkaline battery cathodes. Nevertheless, stretching/working might provide useful for coin cells. Furthermore, so long as the graphite formed consistent pathways, advantages might be realized even without forming straight, parallel planes.

Realizing the difficulties in achieving perfect orientation of graphite, additional and/or alternative approaches may be preferred in certain situations. For example, by employing a variety of conductive carbons and/or by introducing the carbons at differing intervals during the mixing/manufacturing process, optimized cathode structures can be achieved. In particular, active material based-mixtures (e.g., manganese dioxide and/or a combination of active materials, binders and optional rheology aids) are processed in the presence of one type of carbon to create agglomerates with conductive material entrained therein. These agglomerates are be subsequently mixed and processed with a second conductor so as to optimize the conductivity of the entire mix. In this arrangement, the relative size of the differing carbons is tailored to the processing step and point in time in which they are introduced to the cathode mixture.

Figure 3:
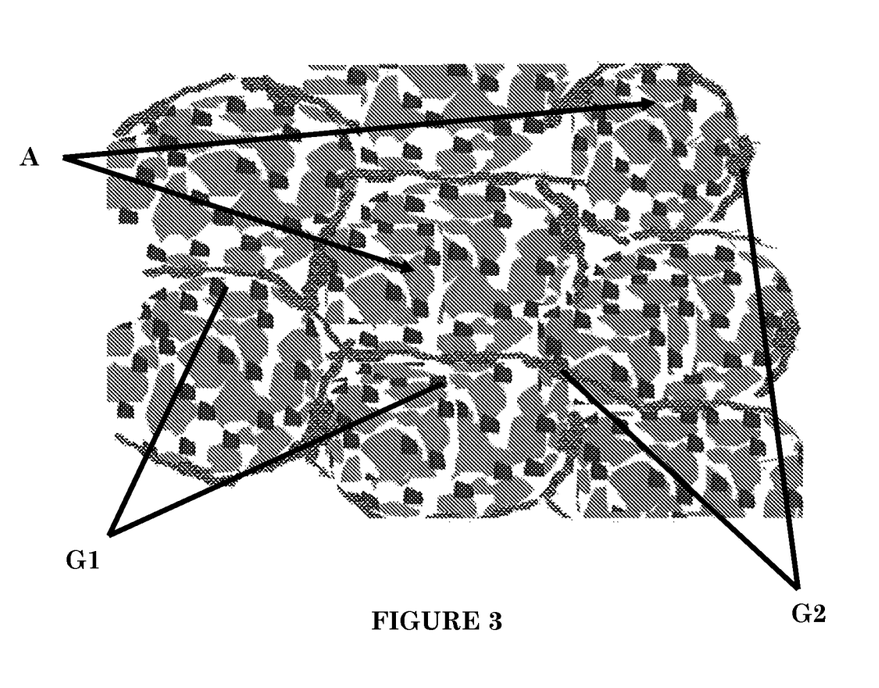
FIG. 3 diagrammatically illustrates another embodiment of the invention.

FIG. 3 illustrates one embodiment that can result from this two-carbon approach. Agglomerates A comprise a plurality of active material particulates M adhered to one another with a first conductive material G1 interposed and adhered within the agglomerate A. A separate conductive material G2 adheres to at least a portion of the exterior surface of each agglomerate. The O:C ratio for agglomerates A could be the same as different from that of the entire electrode/cathode structure. As above, the current flow (not shown in FIG. 3) is expected to move through this material in a consistent direction, although the structure depicted in FIG. 3 is well suited to adapt to whatever direction that preferred flow may be.

Preferably, conductive material G1 is an expanded or unexpanded graphite or other conductive carbon that is mixed with the active material particulates M in a high energy mixing method. This fluff mixture is then densified via, as a non-limiting example, a twin roll calendar. The resulting densified/comp acted mixture will consist mostly of agglomerates A with conductive materials effectively entrained within the agglomerate.

The second conductive material G2 has different, and preferably larger, size in comparison to the first conductive material G1. More preferably, the material G2 is also larger than the active material particulates M and the agglomerates A, as this will simplify the process of coating the agglomerates A. Ultimately, the material G2 is mixed via a low energy mixing method to distribute and effectively coat the material G2 onto and in between the agglomerates.

In forming and coating (or otherwise adhering) the above mentioned components during either or both of the high and low energy mixing phases, it may be possible to use rheology or processing aids to improve the overall process. Such aids would assist in establishing and maintaining the desired flow of particles. In the same manner, known surfactants and/or adhesive binders could be incorporated in order to achieve the desired structure, as shown in FIG. 3 and described herein. Additionally or alternatively, functional groups or other aspects of the conductive carbon's surface could be selected and/or engineered to achieve these same properties. Collectively, such additives are well known, and may include by way of non-limiting examples materials such as coathylene, polytetrafluoroethylene (PTFE), and/or barium sulfate-based materials.

In one embodiment, material G1 is a synthetic graphite, such as KS6 or MX15, which are both sold by Imerys Graphite & Carbon of Bodio, Switzerland. Generally speaking, it is desirable for material G1 to have a relatively consistent, smaller shape (expanded or unexpanded) and size in comparison to both material G2 and active material particulates M.

The material G2 should be a highly anisometric graphite, such as an expanded graphite, graphene and/or graphite tubes or rods. Exemplary forms of such conductive materials are sold under a variety of trade names by Superior Graphite of Chicago, Ill., USA; Chuetsu Graphite Works Co., Ltd. of Osaka, Japan; and/or Imerys as noted above.

Because a more compact carbon is integrated within the active material agglomerate, it is not as important to align the second, more anisometric carbon in a unitary direction. Instead, the second carbon needs to adhere to a portion of the surface of the agglomerates so as to provide a conductive path that follows the contours of the active material agglomerates. As used herein, "adhere" may include coating processes (with or without the use of binders) and/or other processes which result in the components remaining in close proximity (e.g., mechanical, chemical, dispersive, electrostatic, diffusive, etc.) The resulting cathode structure is volumetrically optimized because interstices within and between the agglomerates that would otherwise be voids can now be filled with differing conductive materials without the need to substitute conductive material for the active material itself.

Further, it will be understood that that the presence of the conductive carbons is intended to enhance the overall conductivity of the cathode structure itself. As such, the amount of conductors G1 and/or G2 should be minimized so as to allow for the addition of cathode active material M to maximize discharge performance. In the same manner, owing to the hydrophobicity of certain carbons and the need to retain ionic conductivity, a complete and hermetic coating of the agglomerates is not desired. In fact, the use of carbon, and more specifically graphite, coating on the agglomerates should be sufficient to maintain a conductive network between the plurality of agglomerates in the cathode, while the carbon/graphite within the agglomerates is intended to enhance internal conductivity.

The invention is expected to have particular utility in the realm of primary alkaline battery cathodes. Such cathodes must possess certain unique characteristics, particularly in comparison to rechargeable battery electrodes and/or systems relying on current collectors, organic solvent electrolytes, additional conductive diluents (e.g., metal powders, etc.), and the like. Foremost, the structure described herein, particularly with respect to agglomerates incorporating two different types of graphite, should be well-suited to the formation of impact or ring molded structures. Because these structures do not need to retain any cycling capabilities, the stability of the structure is of minimal concern after repeated charge and discharge cycling. Further the reliance on a highly conductive aqueous electrolyte largely obviates the need to extensively use discrete, intra-electrode current collection devices (beyond the graphites entrained in and coated partially on the agglomerates), thereby freeing up more volume that may be devoted to active material.

Any of the foregoing processes could be used in combination with one another so as to achieve the desired conductor orientation and/or conductive cathode structure. The ultimate end goal is to create an engineered cathode structure that is volumetrically optimized for conductivity and/or maximum active material content. Batteries incorporating these cathode structures, and particularly standard sized cylindrical batteries (e.g., AA-, AAA-, C-, and D-sizes) and standard sized coin and button cell batteries (like the types used in watches, hearing aids, and small electronic devices), are also contemplated.

The efficacy of cathode structure formation according to the various embodiments described herein may be measured indirectly, particularly to the extent it may prove difficult to directly detect the alignment (or lack of alignment) of the conductive particles. Consequently, a control cathode mix may be formed through conventional, random dispersion of the cathode components. In parallel, any of the inventive structures are formed from a similar mixture, but further utilizing the methods described above (e.g., stretching/working, high and low energy staged mixing of different components, etc.).

The control and inventive electrodes thus formed are then subjected to identical testing protocols. For example, an array of microprobes may be used to "map" the conductivity at discrete locations across the length and width of the electrodes. Such mapping provides insights as to the consistency of conductivity across each electrode's face, with the inventive cathode expected to exhibit more consistent conductivity among the various mapped locations in comparison to the control electrode. Further, when the conductivity of the entire inventive electrode is compared against the control cathode, the inventive cathode should show significant improvements in its overall conductivity owing to the organized structure of conductive networks as described herein. In the event it is not possible to formulate a control, comparisons could be made to previously known and/or commercially available alkaline consumer batteries which, as of the date of this application, do not incorporate the inventive cathode structures. Also, resistivity and/or other similar performance metrics correlating to the presence and alignment of conductive materials in the electrode may be used in addition to or in place of conductivity measurements.

Of course, traditional imaging and analytic techniques may also be used to verify the existence of the desired orientation and/or cathode structure. By way of non-limiting example, scanning electron microscopy and computerized tomography are potential tools.

While traditional alkaline primary cells and cathodes are anticipated to obtain the most benefits from the invention, it will be understood that multiple active materials may be used. For example, in addition to manganese dioxides, active additives such as nickel oxyhyrdroxide, delithiated metal oxides and other materials could be used. Preferably, the active materials used in this invention will comprise at least 50 wt. %, at least 75 wt. %, and at least 90 wt. % of manganese dioxide or manganese oxide-based materials in comparison to the total mass of all cathode components in a dry state prior to any mixing (i.e., the final molded cathode, which is free from any separate substrate/current collector).

Figure 4:
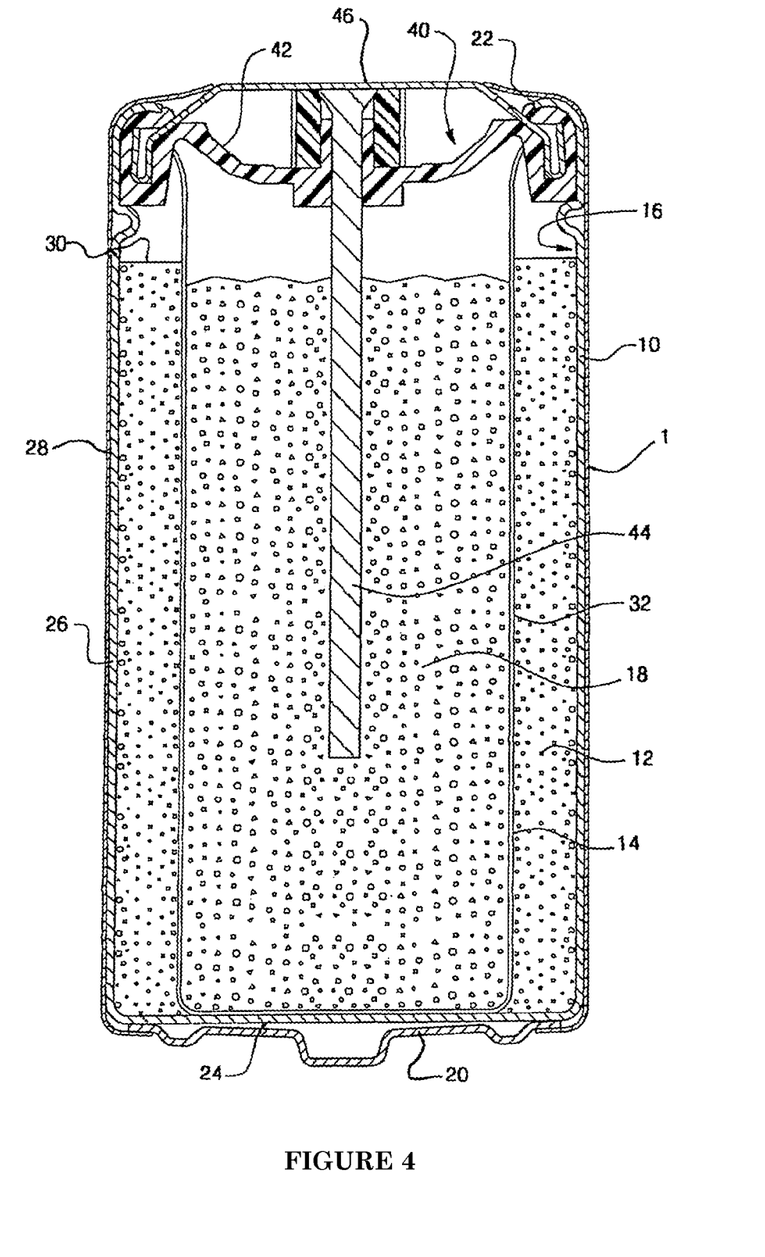
FIG. 4 is a cross-sectional view of a standard, cylindrical alkaline battery useful to certain embodiments of the invention.

For the sake of completeness, FIG. 4 illustrates other components of electrochemical cells according to certain embodiments of the invention. Specifically, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties, that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 there between. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is the preferred main active material for the negative electrode of the present invention. Preferably, the volume of zinc utilized in the negative electrode is sufficient to maintain a desired particle-to-particle contact and a desired anode to cathode (A:C) ratio. The volume of zinc in the negative electrode can range from about 20 to about 32 volume percent, more preferably about 24 to about 30 volume percent. Notably, the solids packing of the negative electrode mix remains relatively unchanged from previously known designs, despite a lower overall concentration of zinc, because the relative volume contributions by the zinc and the zinc oxide are similar. The volume percent zinc is determined by dividing the volume of zinc by the volume of the negative electrode just prior to dispensing the negative electrode into the separator lined cavity as will be explained below. The volume percent zinc must be determined before dispensing the negative electrode into the separator basket because a portion of the electrolyte incorporated into the negative electrode migrates into the separator and cathode as soon as the negative electrode is inserted into the cavity defined by the separator. The volume percent zinc is based on the density of zinc (7.13 g/cc), the volume of the negative electrode mix and the weight of the negative electrode mix.

Zinc suitable for use in the present invention may be purchased from a number of different commercial sources under various designations, such as BIA 100, BIA 115. Umicore, S. A., Brussels, Belgium is an example of a zinc supplier. Zinc alloys may be adjusted to reduce negative electrode gassing in cells and to maintain test service results.

The amount of zinc present in the negative electrode ranges generally from about 62 to about 72 weight percent, desirably from about 64 to about 70 weight percent, and preferably about 67 to about 69 weight percent based on the total weight of the negative electrode (i.e., all components including zinc, additives, gelling agent and electrolyte).

In order to facilitate processing the negative electrode and to enhance its gassing performance, stability, conductivity and the like, the zinc is usually suspended in a gelling agent that effectively suspends the anode material relying on the smallest possible amount of gelling agent. For example, cross-linked poly(meth)acrylic acid gelling agents have found wide-spread use, including cross-linked polyacrylate polymers sold under the Carbopol® 940 tradename by Lubrizol Corporation of Wickliffe, Ohio, USA (hereafter, "Carbopol"). Other materials exhibiting sufficient cross-linking, such as carboxymethyl cellulose, crosslinked acrylic acid copolymers, starch-graft copolymers of polyacrylic acid and polyacrylamide, and alkali hydrolyzed polyacrylonitrile, may also be used.

Another common anode additive is solid zinc oxide. A higher concentration of solid zinc oxide tend to increase high rate service, such as DSC service, but also increase negative electrode viscosity and yield stress which can create negative electrode dispensing problems. Lower concentrations of solid zinc oxide will decrease high rate DSC service.

One or more surfactants may also be used in the negative electrode formulation. These surfactants may be either a nonionic or anionic surfactant, or a combination thereof is present in the negative electrode. A preferred surfactant may be DISPERBYK-190 from BYK-Chemie GmbH of Wesel, Germany.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing.

Second electrode 12, also referred to herein as the positive electrode or cathode, preferably includes manganese dioxide as the electrochemically active material. Manganese dioxide is present in an amount generally from about 80 to about 95 weight percent and preferably from about 87 to 94 weight percent by weight based on the total weight of the positive electrode, i.e., manganese dioxide, conductive material, positive electrode electrolyte and additives such as barium sulfate. Manganese dioxide is commercially available as natural manganese dioxide (NMD), chemical manganese dioxide (CMD), or electrolytic manganese dioxide (EMD). The preferred manganese dioxide for use in a cell of this invention is EMD. Suppliers of these materials include Tronox Limited of Stamford, Conn., USA; Tosoh Corporation of Tokyo, Japan; and Erachem Comilog, Inc. of Baltimore, Md.

The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed.

Second electrode 12 has a ledge 30 and an interior surface 32 as illustrated in FIG. 4. Alternatively, the positive electrode may be formed by pre-forming a plurality of rings from the mixture comprising manganese dioxide and then inserting the rings into the container to form the tubular-shaped second electrode. The cell shown in FIG. 4 would typically include 3 or 4 rings.

The positive electrode can include other components such as a conductive material, for example graphite, that when mixed with the manganese dioxide provides an electrically conductive matrix substantially throughout the positive electrode. Conductive material can be natural, i.e., mined, or synthetic, i.e., manufactured. In one embodiment, the cells of the present invention include a positive electrode having an active material or oxide to carbon ratio (O:C ratio) that ranges from about 12 to about 25. Too high of an oxide to carbon ratio increases the container to cathode resistance, which affects the overall cell resistance and can have a potential effect on high rate tests, such as the DSC test, or higher cut-off voltages. Furthermore the graphite can be expanded or non-expanded. Suppliers of graphite for use in alkaline batteries are noted above. Conductive material is present generally in an amount from about 3 to about 10 weight percent based on the total weight of the positive electrode. Too much graphite can reduce manganese dioxide input, and thus cell capacity; too little graphite can increase container to cathode contact resistance and/or bulk cathode resistance. An example of an additional additive is barium sulfate ($BaSO_4$), which is commercially available from Solvay Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as coathylene, and calcium stearate.

In one embodiment, the positive electrode component, such as the manganese dioxide, conductive material, and barium sulfate are mixed together to form a homogeneous mixture. During the mixing process, an alkaline electrolyte solution, such as from about 37% to about 40% KOH solution, is evenly dispersed into the mixture thereby insuring a uniform distribution of the solution throughout the positive electrode materials. The mixture is then added to the container and molded utilizing a ram. Moisture within the container and positive electrode mix before and after molding, and components of the mix are preferably optimized to allow quality positive electrodes to be molded. Mix moisture optimization allows positive electrodes to be molded with minimal splash and flash due to wet mixes, as well as spalling and excessive tool wear due to dry mixes, with optimization helping to achieve a desired high cathode weight. Moisture content in the positive electrode mixture can affect the overall cell electrolyte balance and has an impact on high rate testing.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell of the present invention that utilizes zinc in the negative electrode or anode and manganese dioxide in the positive electrode or cathode, the A:C ratio is preferably greater than 1.32:1, desirably greater than 1.34:1, and preferably 1.36:1 for impact molded positive electrodes. The A:C ratio for ring molded positive electrodes can be lower, such as about 1.2:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 90 degree. relative to each other. Conventional pre-formed separators are typically made up of a sheet of non-woven fabric rolled into a cylindrical shape that conforms to the inside walls of the second electrode and has a closed bottom end.

The foregoing description identifies various non-limiting embodiments of the invention. Modifications may occur to those skilled in the art and to those who may make and use the invention. The disclosed embodiments are merely for illustrative purposes and not intended to limit the scope of the invention or the subject matter set forth in the claims

What is claimed is:

1. A method of making a cathode structure for an alkaline battery comprising:
    a first mixing step including dispersing a first conductive material in a particulate active material and forming agglomerates in which the first conductive material is entrained within the agglomerates, wherein the active material comprises manganese dioxide; and
    a second mixing step including adhering a second conductive material with at least a portion of a surface of the agglomerates; and
    wherein the second conductive material comprises particles of a larger size in comparison to particles of the first conductive material.

2. The method according to claim 1, wherein the forming of agglomerates comprises compacting the dispersed first conductive material and particulate active material.

3. The method according to claim 1, wherein the manganese dioxide consists of at least 90 wt. % of the cathode structure.

4. The method according to claim 1, wherein the first conductive material comprises synthetic graphite.

5. The method according to claim 4, wherein the second conductive material comprises at least one selected from the group consisting of: unexpanded graphite, expanded graphite, graphene, graphite tubes, and graphite rods.

6. A method of making a cathode structure for an alkaline battery comprising:
- a first mixing step including dispersing a first conductive material in a particulate active material and forming agglomerates in which the first conductive material is entrained within the agglomerates;
- a second mixing step including adhering a second conductive material with at least a portion of a surface of the agglomerates; and
- orienting the first conductive material to align the first conductive material in a common direction within the cathode structure; and
- wherein the second conductive material comprises particles of a larger size in comparison to particles of the first conductive material.

7. The method according to claim 6, wherein the orienting of the first conductive material includes at least one of: stretching, freeze casting, co-extrusion, and magnetic orientation.

8. A method of making a cathode structure for an alkaline battery comprising:
- a first mixing step including dispersing a first conductive material in a particulate active material and forming agglomerates in which the first conductive material is entrained within the agglomerates;
- a second mixing step including adhering a second conductive material with at least a portion of a surface of the agglomerates; and
- forming the cathode structure produced by the second mixing step into a tubular cylinder; and
- wherein the second conductive material comprises particles of a larger size in comparison to particles of the first conductive material.

9. The method according to claim 8, wherein the forming the cathode structure is achieved by ring molding or impact molding.

10. The method according to claim 6, wherein the forming of agglomerates comprises compacting the dispersed first conductive material and particulate active material.

11. The method according to claim 6, wherein the first conductive material comprises synthetic graphite.

12. The method according to claim 11, wherein the second conductive material comprises at least one selected from the group consisting of: unexpanded graphite, expanded graphite, graphene, graphite tubes, and graphite rods.

13. The method according to claim 6, wherein the active material comprises manganese dioxide.

14. The method according to claim 8, wherein the forming of agglomerates comprises compacting the dispersed first conductive material and particulate active material.

15. The method according to claim 8, wherein the first conductive material comprises synthetic graphite.

16. The method according to claim 15, wherein the second conductive material comprises at least one selected from the group consisting of: unexpanded graphite, expanded graphite, graphene, graphite tubes, and graphite rods.

17. The method according to claim 8, wherein the active material comprises manganese dioxide.

18. The method according to claim 1, further comprising orienting the first conductive material to align the first conductive material in a common direction within the cathode structure.

19. The method according to claim 8, further comprising orienting the first conductive material to align the first conductive material in a common direction within the cathode structure.

* * * * *